United States Patent Office 2,702,605
Patented Feb. 22, 1955

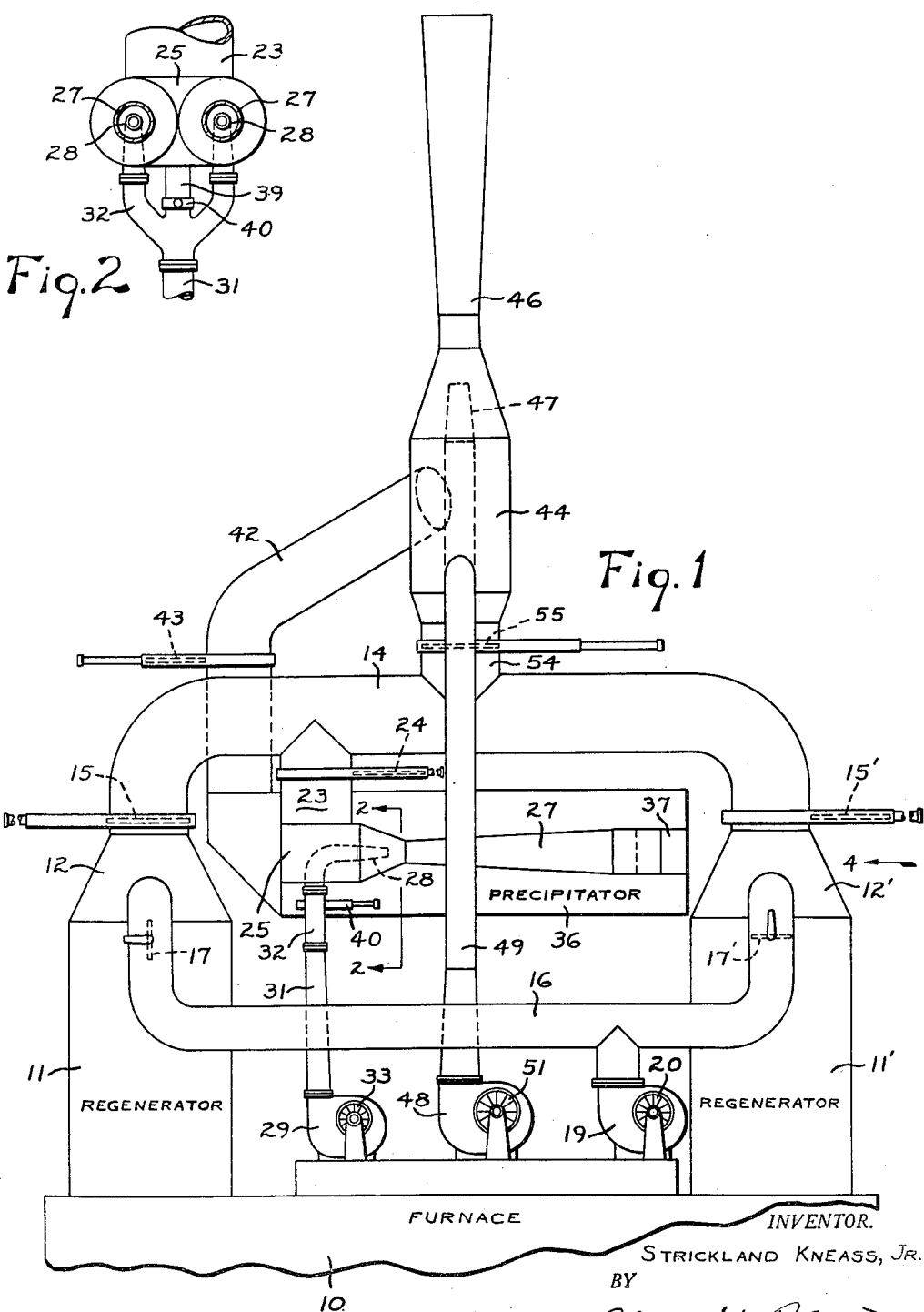
Feb. 22, 1955 — S. KNEASS, JR — 2,702,605
FURNACE CONTROL APPARATUS
Filed Dec. 7, 1950 — 2 Sheets-Sheet 1
INVENTOR.
STRICKLAND KNEASS, JR.
BY
Albert G. Blodgett
ATTORNEY Feb. 22, 1955 S. KNEASS, JR 2,702,605
FURNACE CONTROL APPARATUS
Filed Dec. 7, 1950 2 Sheets-Sheet 2
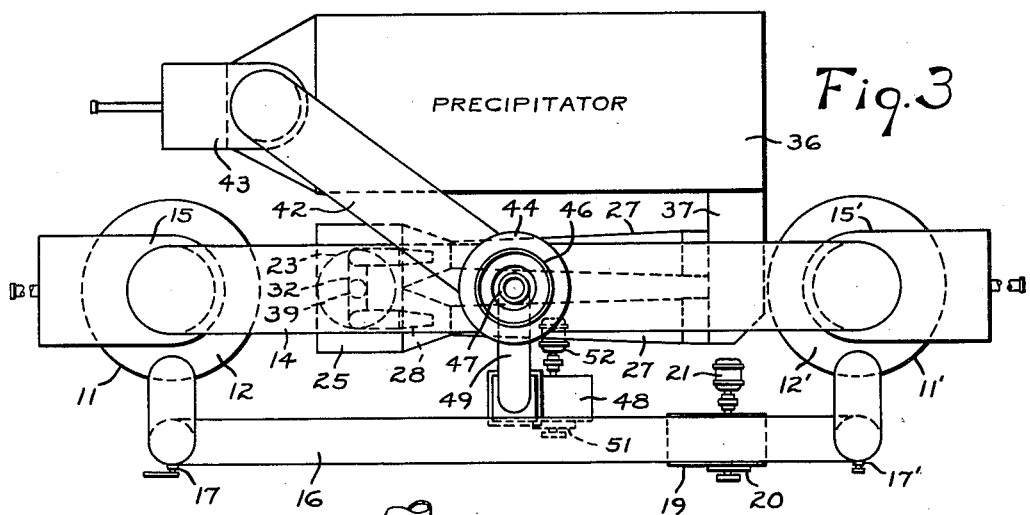
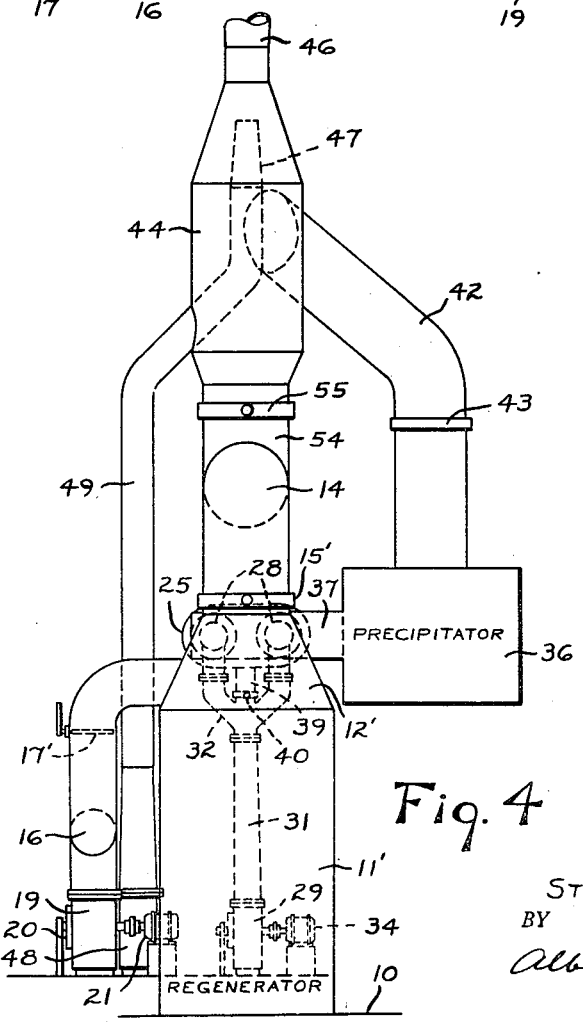
INVENTOR.
STRICKLAND KNEASS, JR.
BY
ATTORNEY

2,702,605

FURNACE CONTROL APPARATUS

Strickland Kneass, Jr., Boylston, Mass., assignor to Morgan Construction Company, Worcester, Mass., a corporation of Massachusetts Application December 7, 1950, Serial No. 199,666

2 Claims. (Cl. 183—35)

This invention relates to furnace control apparatus, and more particularly to apparatus for controlling the flow of hot gases from furnaces of the regenerative type.

The gases discharged from certain types of regenerative furnaces, viz. open hearth steel furnaces, carry considerable quantities of foreign matter in the form of fine dust-like particles. The resultant atmospheric pollution has resulted in a demand for an apparatus which will remove these particles from the gases before they escape into the atmosphere. While gas cleaners of various types are known which will operate in an efficient manner to remove dust from gases at somewhat elevated temperatures, such gas cleaners cannot withstand the very high temperatures at which gases are ordinarily discharged from open hearth furnaces and the like. Consequently, no satisfactory solution to the problem has been available heretofore.

It is accordingly one object of the invention to provide a relatively simple and dependable apparatus for controlling the flow of hot furnace gases from a regenerative furnace, and for removing particles of foreign matter from such gases.

It is a further object of the invention to provide an apparatus for withdrawing the hot gases from a regenerative furnace, in combination with a gas cleaner of known construction for cleaning the gases, together with means whereby the gas cleaner can be protected from excessively high temperatures.

With these and other objects in view, as will be apparent to those skilled in the art, the invention resides in the combination of parts set forth in the specification and covered by the claims appended hereto.

In accordance with the invention in its preferred form, there are provided two furnace regenerators from which hot gas is withdrawn alternately. There is also provided a gas cleaner of suitable construction for cleaning the gas. The gas is withdrawn from the regenerators and delivered to the gas cleaner by means of an ejector including a nozzle through which cool air is discharged into the gas to cause the desired gas flow and to reduce the temperature of the gas before it enters the gas cleaner. The rate of air supply to the nozzle can be varied as required to control the pressure within the furnace associated with the regenerators. Preferably additional cool air is supplied for mixture with the gas at a rate which can be varied as required to prevent the gas from entering the gas cleaner at too high a temperature. A second ejector is preferably provided to withdraw the cleaned gas from the gas cleaner, this second ejector including a nozzle through which air is discharged into the gas at a rate which can be varied as required to control the pressure within the gas cleaner.

Referring to the drawings illustrating one embodiment of the invention and in which like reference numerals indicate like parts, Fig. 1 is a side elevation of certain furnace control apparatus;

Fig. 2 is a fragmentary view taken in section on the line 2—2 of Fig. 1;

Fig. 3 is a top plan view of the apparatus; and

Fig. 4 is an elevation taken as indicated by the arrow 4 in Fig. 1.

As shown in Fig. 1, there is provided a furnace 10, which may be an open hearth steel furnace, with two vertical regenerators 11 and 11' at its opposite ends. The upper ends of the regenerators are provided with chambers 12 and 12' respectively, and the upper ends of these chambers are connected by a hot gas duct 14 which is provided with slidable dampers 15 and 15' at its opposite ends. The sides of the chambers 12 and 12' are connected by a combustion air duct 16 having pivotally mounted dampers 17 and 17' at its opposite ends. Combustion air is supplied to the duct 16 by means of a fan 19 having inlet vanes 20 which can be adjusted to vary the flow of the air as desired. This fan is driven by a motor 21 (Fig. 3). It will be apparent that with the dampers 17 and 15' open, and dampers 15 and 17' closed, as in Fig. 1, the combustion air from the fan 19 will all flow downwardly through the regenerator 11 to receive heat therefrom and to support the combustion of fuel in the furnace 10, while the hot gases from the furnace will travel upwardly through the regenerator 11' to heat the same and then to enter the duct 14. Upon reversal of the furnace in known manner after a suitable time interval, with the dampers 15 and 17' open and the dampers 17 and 15' closed, the combustion air will travel downwardly through the regenerator 11' while the hot gases travel upwardly through the regenerator 11.

Means is provided to withdraw the hot gases from the duct 14 and thus maintain suitable draft conditions within the furnace 10. For this purpose a duct 23 (preferably with a normally open slidable damper 24 therein) leads downwardly from the duct 14 to an inlet box 25 from which two parallel ejector tubes 27 extend horizontally beneath the duct 14. The tubes 27 are of Venturi shape. Within the inlet end of each ejector tube 27 there is mounted an ejector nozzle 28 arranged to discharge air into the tubes, so that the hot gases will be entrained and withdrawn from the box 25. Air is supplied to the nozzles 28 by a fan 29 through a pipe 31 and a bifurcated fitting 32. This fan has inlet vanes 33 which can be adjusted to control the rate of air flow through the fan and thereby maintain the desired pressure within the furnace 10. The fan 29 is driven by an electric motor 34 (Fig. 4).

In order to remove fine particles of solid material from the hot gases, there is provided a gas cleaner 36 of any suitable type, several forms of which are known. Some of these gas cleaners employ electrostatic charges to attract the fine particles, while others employ ultra-sonic vibrations to agglomerate the particles and remove them from the gas stream, and still others employ water sprays or the like to wash the particles from the gas. The gas cleaner 36 as shown is mounted at one side of the ejector tubes 27, and a duct 37 leads from the discharge ends of the tubes to the inlet of the gas cleaner. Since the gas cleaner would be seriously damaged by very high temperatures, provision is made to limit the temperature of the gases entering the gas cleaner by introducing cool air into the gases before they enter the ejector tubes 27. For this purpose a pipe 39 leads upwardly from the center of the fitting 32 to the ejector inlet box 25, and a slidable damper 40 is mounted in this pipe. Adjustment of the damper will make it possible to control the temperature of the gases entering the gas cleaner.

The clean gases are withdrawn from the gas cleaner 36 and discharged into the atmosphere. As shown, a duct 42 (preferably with a normally open slidable damper 43 therein) leads from the outlet of the gas cleaner to the inlet box 44 of an ejector 46. The nozzle 47 of this ejector is supplied with air by a fan 48 through a pipe 49. The fan 48 has inlet vanes 51 which can be adjusted as desired to regulate the rate of air flow through the nozzle 47 and thereby control the pressure within the gas cleaner. This fan is driven by an electric motor 52 (Fig. 3). In order to permit by-passing of the gas cleaner, a duct 54 (with a normally closed slidable damper 55 therein) connects the hot gas duct 14 to the ejector inlet box 44 thereabove.

The operation of the invention will now be apparent from the above disclosure. The by-pass damper 55 will ordinarily be closed, while the dampers 24 and 43 will remain open. The fan 19 will supply air for combustion of fuel in the furnace 10, this air flowing downwardly through the regenerators 11 and 11' alternately. The fan 29 will supply air to the nozzles 28, so that the ejectors 27 will draw hot gases upwardly through the regenerators alternately. The direction of flow of the combustion air and of the hot gases will be determined by the positions of the dampers 15—15' and 17—17'. The ejection air from the nozzles 28 will mix with the hot gases and produce a gaseous mixture having an appreciably lower temperature. This mixture will flow through the gas cleaner 36, which will remove particles of solid material therefrom, and the cleaned gases will travel through the duct 42 and be discharged to atmosphere by the ejector 46. If the temperature of the gaseous mixture entering the gas cleaner exceeds a predetermined maximum value, the damper 40 will be opened to admit cool air through the pipe 39 to the inlet box 25 in the amount required to protect the gas cleaner from damage by overheating. The pressure within the gas cleaner will be controlled by adjustment of the inlet vanes 51 of the fan 48 which supplies air to the ejector 46. If for any reason it becomes necessary to take the gas cleaner out of service, the furnace can be kept in operation by closing the dampers 24 and 43, and opening the damper 55, so that the ejector 46 can withdraw hot gases directly from the duct 14 through the by-pass duct 54.

The two laterally adjacent ejector tubes 27 provide the necessary gas-handling capacity within the relatively short horizontal space available between the two regenerators.

Having thus described my invention, what I claim as new and desire to secure by Letters Patent is:

1. An apparatus for use with an industrial furnace having two regenerators each communicating with a respective end of the furnace, comprising: a conduit connected at its ends to the regenerators, an ejector-type exhaust stack to which the conduit is connected in its intermediate portion for providing communication between the regenerators and the stack, a fan for rendering the stack operative, draft means for causing air to flow through the regenerators into the furnace, dampers associated with said draft means for determining alternate air flow to the regenerators, dampers associated with said conduit for determining alternate flow of gas from said regenerators to said stack, an ejector comprising two venturi tubes connected to said conduit for drawing gas therefrom, a second draft means connected to said venturi tubes for supplying air thereto, a gas cleaner connected to said ejector for receiving gas and air therefrom, said gas cleaner being connected to the stack for discharge of the gas and air, means associated with said ejector for introducing air into the gas stream in addition to that introduced by the venturi tubes in order that the temperature of the gas and air entering the gas cleaner may be lowered, means controlling the amount of said additional air, a gas valve for controlling the flow of gases directly from the said conduit means to the stack, and a second gas valve for controlling the flow of gases into the ejector means from said conduit.

2. An apparatus for use with an industrial furnace having two regenerators each communicating with a respective end of the furnace, comprising: a conduit connected at its ends to the regenerators, an ejector type exhaust stack to which the conduit is connected for providing communication between the regenerators and the stack, draft means for causing air to flow through the regenerators into the furnace, dampers associated with said draft means for determining alternate air flow to the regenerators, dampers associated with said conduit for determining alternate flow of gas from said regenerators to said stack, an ejector comprising Venturi tubes connected to said conduit for drawing gas therefrom, a second draft means connected to said Venturi tubes for supplying air thereto, a gas cleaner connected to said ejector for receiving gas and air therefrom, said gas cleaner being connected to the stack for discharge of the gas and air, means associated with said ejector for introducing air into the gas stream in addition to that introduced by the Venturi tubes in order that the temperature of the gas and air entering the gas cleaner may be lowered, means controlling the amount of said additional air, a gas valve for controlling the flow of gases directly from the said conduit means to the stack, and a second gas valve for controlling the flow of gases into the ejector means from said conduit.

References Cited in the file of this patent

UNITED STATES PATENTS

| | | |
|---|---|---|
| 952,970 | Whitmore | Mar. 22, 1910 |
| 1,012,301 | Van Horn et al. | Dec. 19, 1911 |
| 1,183,397 | Newcomb | May 16, 1916 |
| 1,202,953 | Adams | Oct. 31, 1916 |
| 1,204,906 | Schmidt et al. | Nov. 14, 1916 |
| 1,221,505 | Bradley et al. | Apr. 3, 1917 |
| 2,382,253 | Penney et al. | Aug. 14, 1945 |
| 2,537,558 | Tigges | Jan. 9, 1951 |

FOREIGN PATENTS

| | | |
|---|---|---|
| 29,476 | France | May 5, 1925 |
| | (Addition to No. 587,510) | |
| 587,510 | France | Jan. 19, 1925 |